US00RE39215E

(19) United States
(12) Reissued Patent
Bjornard et al.

(10) Patent Number: US RE39,215 E
(45) **Date of Reissued Patent: *Aug. 1, 2006**

(54) ANTIREFLECTION COATING FOR A TEMPERATURE SENSITIVE SUBSTRATE

(75) Inventors: Erik J. Bjornard, Northfield, MN (US); William A. Meredith, Jr., Faribault, MN (US)

(73) Assignee: Tru Vue, Inc., Chicago, IL (US)

( * ) Notice: This patent issued on a continued prosecution application filed under 37 CFR 1.53(d), and is subject to the twenty year patent term provisions of 35 U.S.C. 154(a)(2).

(21) Appl. No.: 08/914,868

(22) Filed: Aug. 19, 1997

Related U.S. Patent Documents

Reissue of:
(64) Patent No.: 5,579,162
Issued: Nov. 26, 1996
Appl. No.: 08/332,291
Filed: Oct. 31, 1994

(51) Int. Cl.
*G02B 1/10* (2006.01)
*G02B 5/08* (2006.01)

(52) U.S. Cl. ..... 359/586; 359/588; 359/580; 427/162

(58) Field of Classification Search ..... 359/580, 359/584, 586, 587, 588, 589, 359; 427/162
See application file for complete search history.

(56) References Cited

U.S. PATENT DOCUMENTS

| | | | | |
|---|---|---|---|---|
| 2,478,385 A | | 8/1949 | Gaiser | 359/580 |
| 3,432,225 A | | 3/1969 | Rock | 359/588 |
| 3,565,509 A | | 2/1971 | Sulzbach | 359/588 |
| 3,781,090 A | | 12/1973 | Sumita | 359/588 |
| 4,799,745 A | | 1/1989 | Meyer et al. | 350/1.7 |
| 4,954,383 A | | 9/1990 | King et al. | 428/131 |
| 5,091,244 A | | 2/1992 | Bjornard | 428/216 |
| 5,105,310 A | | 4/1992 | Dickey | 359/586 |
| 5,147,125 A | | 9/1992 | Austin | 359/359 |
| 5,270,858 A | | 12/1993 | Dickey | 359/586 |
| 5,362,552 A | | 11/1994 | Auston | 428/216 |
| 5,372,874 A | | 12/1994 | Dickey et al. | 428/216 |
| 5,407,733 A | | 4/1995 | Bjornard et al. | 428/216 |
| 5,494,743 A | | 2/1996 | Woodard et al. | 428/336 |
| 5,579,162 A | * | 11/1996 | Bjornard et al. | 359/584 |
| 5,667,880 A | * | 9/1997 | Okaniwa | 359/359 |

FOREIGN PATENT DOCUMENTS

| | | |
|---|---|---|
| DE | 4117256 | 5/1991 |
| DE | 41177256 | 5/1991 |
| EP | 0183052 | 10/1985 |
| EP | 0586050 | 6/1993 |
| JP | 61-168899 | 7/1986 |
| JP | 63-131101 | 6/1988 |
| JP | 162943 | 7/1991 |
| JP | 173638 | 7/1991 |
| JP | 04-251801 | 9/1992 |
| JP | 06-34802 | 2/1994 |
| JP | 06-130204 | 5/1994 |

OTHER PUBLICATIONS

Lockhart, Luther B. and King, Peter, "Three–Layered Reflection–Reducing Coatings", *J. Opt. Sco. Am.*, vol. 37, pp. 689–694 (1947).*

Lockhart and King, *Three–Layered Reflection–Reducing Coatings, J. Opt. Sco. Sm., 37*:689, 1947.

Pawlewicz, et al., *Multilayer optical coating fabrication by dc magnetron reactive sputtering, Optical Thin Films II: New Developments, Proceedings of SPIE—The International Society for Optical Engineering, 678*:134, Aug. 19–20, 1986, San Diego, California.

* cited by examiner

*Primary Examiner*—Audrey Chang
(74) *Attorney, Agent, or Firm*—Dorsey & Whitney LLP

(57) ABSTRACT

A multilayer antireflection coating for a temperature sensitive substrate such as plastic. One layer is a DC reactively sputtered metal oxide which may be deposited quickly and without imparting a large amount of heat to the substrate. Another layer has a refractive index lower than the substrate.

44 Claims, 2 Drawing Sheets

ANTIREFLECTION COATING FOR A TEMPERATURE SENSITIVE SUBSTRATE

Matter enclosed in heavy brackets [ ] appears in the original patent but forms no part of this reissue specification; matter printed in italics indicates the additions made by reissue.

BACKGROUND OF THE INVENTION

The present invention relates generally to multilayer antireflection coatings for substrates, and more particularly to multilayer antireflection coatings deposited on temperature-sensitive substrates by DC reactive sputtering.

The simplest antireflection coating is a single layer of a transparent material having a refractive index less than that of a substrate on which it is disposed. The optical thickness of such a layer may be about one-quarter wavelength at a wavelength of about 520 nanometers (nm), i.e., at about the middle of the visible spectrum. The visible spectrum extends from a wavelength of about 420 nm to a wavelength of about 680 nm. A single layer coating produces a minimum reflection value at the wavelength at which the layer's optical thickness is one-quarter of the wavelength. At all other wavelengths the reflection is higher than the minimum but less than the reflection of an uncoated substrate. An uncoated glass surface having a refractive index of about 1.52 reflects about 4.3 percent of the normally-incident light.

Multilayer antireflection coatings are made by depositing two or more layers of transparent dielectric materials on a substrate. At least one layer has a refractive index higher than the refractive index of the substrate. The layer systems usually include at least three layers and are designed to reduce reflection at all wavelengths in the visible spectrum. Multilayer antireflection coatings may yield reflection values of less than 0.25 percent over the visible spectrum.

Most multilayer antireflection coatings are derived from a basic three layer system. The first or outermost layer of this system has a refractive index lower than that of the substrate and an optical thickness of about one-quarter wavelength at a wavelength of about 520 nm. The second or middle layer has a refractive index higher than that of the substrate and an optical thickness of about one-half wavelength at a wavelength of about 520 nm. The third layer, i.e. the layer deposited on the substrate, has a refractive index greater than that of the substrate but less than that of the second layer. The optical thickness of the third layer is also about one-quarter wavelength at a wavelength of about 520 nm. This basic design was first described in the paper by Lockhart and King, "Three Layered Reflection Reducing Coatings", J. Opt. Soc. Am., Vol. 37, pp. 689–694 (1947).

A disadvantage of the basic three layer system is that the refractive indices of the layers must have specific values in order to produce optimum performance. The selection and control of the refractive index of the third layer is particularly important. Deviation from specific refractive index values can not be compensated for by varying the thickness of the layers.

Various modifications of the Lockhart and King system have been made to overcome there disadvantages. For example, the layer system has been modified by forming at least one layer from mixtures of two materials having refractive indices higher and lower than the desired value for the layer. The refractive index of one or more layers has also been simulated by using groups of thinner layers having about the same total optical thickness as the desired layer, but including layers having refractive index values higher and lower than the desired value.

Other modifications have included varying the refractive index of one or more of the layers as a function of thickness, i.e., having the refractive index of a layer inhomogeneous in the thickness direction. This approach is described in U.S. Pat. No. 3,960,441. Another modification is the use of an additional layer between the basic three layer system and the substrate. This additional layer may have an optical thickness of about one-half wavelength, i.e., about half the thickness of the basic system, and a refractive index less than that of the substrate. This modification is disclosed in U.S. Pat. No. 3,781,090.

The layer systems discussed above are generally deposited by thermal evaporation. In thermal evaporation, the time required to deposit the layers may be only a relatively small fraction of the total production time. The production time may be determined by such factors as pump down time for the coating chamber, the time required to heat substrates to process temperatures, and the time required to cool substrates after coating. The number of layers in the coating, the thickness of the layers, and the layer materials may not have a significant influence on production time and thus cost.

DC reactive sputtering is the process most often used for large area commercial coating applications. Metal oxide layers, for example, are deposited by sputtering the appropriate metal in an atmosphere including oxygen. In the reactive sputtering process, the articles to be coated are passed through a series of in-line vacuum chambers, each including sputtering sources, i.e., sputtering cathodes. The chambers are isolated from one another by vacuum locks. Such a system may be referred to as an in-line system or simply a glass coater.

The time taken to deposit the layers is determined mainly by the number of layers and the sputtering rate of the materials. The use of a glass coater to deposit multilayer antireflection coatings can significantly reduce their cost, extending their range of application. Such coatings may be used on picture frame glass, for a display case, and as thermal control coatings for architectural and automobile glazings.

Many of the materials used in thermal evaporation processes, particularly fluorides and sulfides, are not easily sputtered. Conversely, a few materials, such as zinc oxide (ZnO), commonly used in the architectural glass sputtering systems are rarely, if ever used, in thermal evaporation processes. The sputtering rate of different materials may vary by a factor of greater than twenty. The choice of materials, therefore, can have a significant influence on the deposition time and fabrication cost. In an in-line sputtering system with multiple chambers, each chamber may be set up to deposit one specific material. As such, the number of layers that can be deposited is determined by the number of chambers. A coating designed for sputter deposition should therefore be as simple as possible. It should also be made, if possible, from materials which have a high sputtering rate.

A simple improvement on the Lockhart and King system, which may be suitable for in-line sputtering, is described in U.S. Pat. No. 3,432,225, the entire disclosure of which is hereby incorporated by reference. This system, called the Rock system, includes four layers. The first or outermost layer has a refractive index lower than that of the substrate and an optical thickness of about one-quarter wavelength at a wavelength of about 520 nm. The second or middle layer has a refractive index higher than that of the substrate and an optical thickness of about one-half to six-tenths of a wavelength at a wavelength of about 520 nm. The third layer has an optical thickness of about one-tenth of a wavelength at a wavelength of 520 nm and a refractive index less than that of the second layer. The fourth layer has an optical thickness of about one-tenth of a wavelength and a refractive index greater than the second layer and the substrate. The third layer may be the same material as the first layer, and the fourth layer may be the same material as the second layer.

The Rock system may be used with different combinations of materials. Differences in refractive indices may be compensated for by different layer thicknesses. Specifically, for a selected set of materials, the layer thicknesses of the Rock system may be adjusted to provide optimum performance. Specific refractive index values for the layers are not required. If a higher refractive index material were used for the outer layer, then the refractive index of the second layer would also need to be higher to produce the lowest reflectivity. However, in order to obtain the lowest reflection values, the refractive index of the first and third layers should be less than about 1.5, and the refractive index of the second and fourth layers should be greater than about 2.2. A Rock system suitable for sputtering may use silicon dioxide ($SiO_2$) with a refractive index of about 1.46 at 520 nm for the first and third layers, and titanium dioxide ($TiO_2$) with a refractive index of about 2.35 at 520 nm for the second and fourth layers.

Magnesium fluoride (MgFl) can be used to form the outer and third layers. Magnesium fluoride may be deposited by sputtering but requires a reactive atmosphere including fluorine or hydrogen fluoride.

The Rock system is simple as it has only four layers. However, since it requires a relatively high refractive index material, such as titanium dioxide, a, high sputtering rate is difficult to obtain. Typically, the deposition rate for titanium dioxide reactively sputtered from titanium is only one-quarter that of silicon dioxide reactively sputtered from silicon. For a Rock system using titanium dioxide and silicon dioxide, the deposition of titanium oxide would take about four times longer than the deposition of silicon dioxide.

The Rock system may require approximately equal thicknesses of titanium dioxide and silicon dioxide. Silicon dioxide may be sputtered four times faster than titanium dioxide. In order to operate at optimum speed, a glass coater may require four times as many sputtering cathodes for titanium dioxide as for silicon dioxide. However, the coater may not have enough chambers to accommodate all of these titanium dioxide cathodes. Thus, the deposition rate for the silicon dioxide will have to be reduced to "keep pace" with the deposition rate of the titanium dioxide. This reduces output and increases production costs.

It is widely believed that materials which can be deposited at high rates by DC reactive sputtering have relatively low refractive indices. Deposition rate comparisons may be slightly inconsistent from source to source. The type of machine and cathode used may also influence the results. The following approximate rate comparisons serve to illustrate the generalization. The refractive index values cited are the approximate values at a wavelength of about 520 nm. Titanium dioxide has a refractive index of about 2.35, and tantalum oxide ($Ta_2O_5$) has a refractive index of about 2.25. Tantalum oxide may be deposited at about twice the rate of titanium dioxide. Zirconium oxide ($ZrO_2$) has a refractive index of about 2.15 and may be deposited at about twice the rate of titanium dioxide. Tin oxide has a refractive index of about 2.0 and may be deposited about ten times the rate of titanium dioxide. And zinc oxide has a refractive index of about 1.90 and may be deposited about fifteen times the rate of titanium dioxide.

A layer of a material such as zinc oxide or tin oxide in an antireflection coating may be included to cause the coating to be electrically conductive. Zinc oxide may be made conductive by doping it with aluminum, and tin oxide may be made conductive by doping it with antimony. The refractive index of the doped materials remains about 2.0. Other transparent conductive materials having a refractive index of about 2.0 include Cadmium Tin Oxide (Cadmium Stannate) and Indium Tin Oxide (ITO).

A problem of using high index materials in a Rock-type antireflection coating is that such materials are relatively slow to deposit and impart a large quantity of heat to the substrate being coated. Although DC reactively sputtered materials such as titanium dioxide, niobium pentoxide, or tantalum pentoxide, or similar materials have an indices of refraction higher than 2.2, these materials impart so much heat to the substrate that only substrates having a high melting point, such as glass, are suitable. A large amount of heat is transferred to the substrate because the deposition process is slower and therefore there is more time for heat to be transferred, and because the materials are harder and may only be sputtered at higher temperatures. As a result, it is difficult to deposit antireflection coatings on temperature sensitive substrates such as plastic. A temperature sensitive substrate may be said to be a substrate which has a melting point or ignition point lower than the softening point of glass. A glass that is commonly used in anti-reflective coatings is soda lime float glass, which has a softening point of about 620 degrees centigrade.

Accordingly, an object of the present invention is to provide an antireflection coating for a temperature sensitive substrate, such as plastic.

Another object of the present invention is to provide an antireflection coating for economical, high volume production in an in-line reactive sputtering apparatus.

A further object of the present invention is to provide an antireflection coating utilizing materials which may be quickly sputtered in order to reduce the amount of heat transferred to the substrate.

Yet another object of the present invention is to provide an antireflection coating wherein at least one of the layers is tin oxide, indium oxide, zinc oxide, tin-doped indium oxide, bismuth-tin oxide, zinc-tin oxide or antimony-doped tin oxide.

Additional objects and advantages of the invention will be set forth in the description which follows, and in part will be obvious from the description, or may be learned by practice of the invention. The objects and advantages of the invention may be realized and obtained by means of the instrumentalities and combinations particularly point out in the claims.

SUMMARY OF THE INVENTION

The present invention is directed to an antireflection coating for a temperature sensitive substrate. The antireflection coating includes two or more layers substantially transparent to visible light. One of the layers is a DC reactively sputtered metal oxide which may be deposited quickly and without imparting a large amount of heat to the substrate. Suitable metal oxides include tin oxide, indium oxide, zinc oxide, tin-doped indium oxide, antimony-doped tin oxide, bismuth-tin oxide, and zinc-tin oxide. Another layer has a refractive index lower than the substrate.

The antireflection coating may have four layers designated the first, second, third and fourth layers in consecutive numerical order beginning with the layer furthest from the substrate. The first layer has a refractive index lower than the substrate, and has an optical thickness of about one quarter $\lambda_0$. The second layer has a refractive index higher than the substrate and has an optical thickness between about one quarter and one-third of $\lambda_0$. The third layer has a refractive index less than the second layer, and the fourth layer has a refractive index greater than the third layer. Combined, the third and fourth layers have a total optical thickness of less than one quarter $\lambda_0$. The $\lambda_0$, the design wavelength, is between about 480 nm and 560 nm. At least one of the second and fourth layers, and preferably both layers, is composed of a metal oxide layer such as tin oxide, indium oxide, zinc oxide, tin-doped indium oxide, antimony-doped tin oxide, bismuth-tin oxide, and zinc-tin oxide.

BRIEF DESCRIPTION OF THE DRAWINGS

The accompanying drawings, which are incorporated in, and constitute a part of the specification, schematically illustrate a preferred embodiment of the present invention, and together with the general description given above, and the detailed description of the preferred embodiment given below, serve to explain the principles of the invention.

DETAILED DESCRIPTION OF THE INVENTION

The present invention is directed to multilayer antireflection coatings incorporating at least one DC reactively sputtered metal oxide layer. The metal oxide layer must be quick to deposit so that only a small amount of heat is transferred to the underlying substrate. Soft metals usually have fast metal oxide deposition rates. By a fast deposition rate it is meant that the layer may be disposed at least five times faster than titanium dioxide and possibly up to twenty or fifty times faster. In addition, the metal oxide layers must be substantially transparent to visible light. Suitable metals include tin, indium, zinc, tin-doped indium, antimony-doped tin, bismuth-tin, and zinc-tin. Yet another requirement for the metal oxide layer is that it have a reasonably high refractive index. Although a refractive index higher than 2.2, such as titanium dioxide, is not available because such materials are too slow to deposit, a suitable metal oxide layer will have a refractive index between 1.95 and 2.2.

An antireflection coating according to the present invention may have two or more layers which are substantially transparent to visible light. An outer layer should be a dielectric material, such as silicon dioxide, with an index of refraction lower than the substrate. An inner layer should be a metal oxide with a reasonably high refractive index and which may be deposited quickly and without imparting a large amount of heat to the substrate.

A temperature sensitive substrate such as plastic may be covered with this antireflection coating because of the small amount of heat transferred to the substrate. The coating may cover plastic surfaces such as polycarbonate, acrylic, polystyrene, polyethylene, and CR 39. In general, plastics have indices of refraction ranging from 1.43 to about 1.62.

Figure 1:
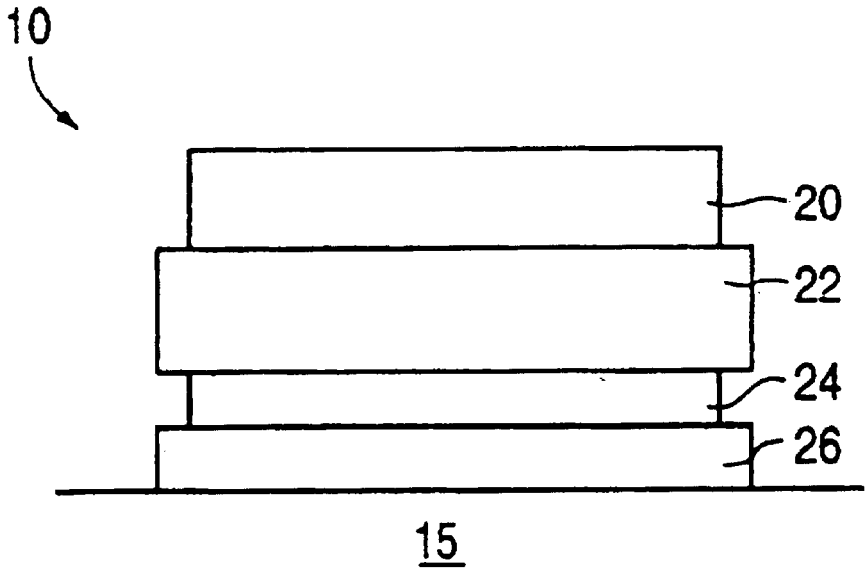
FIG. 1 schematically illustrates a four layer antireflection coating on a temperature sensitive substrate.

As shown in FIG. 1, the present invention may be in the form of a Rock-type antireflection coating. The coating 10 may be formed on a plastic substrate 15. The refractive index of substrate index may be about 1.5 at a wavelength of about 510 nm.

The four layer coating of the present invention includes layers 20, 22, 24, and 26. Layers 20, 22, 24, and 26 may be described both in terms of their optical thicknesses and their physical thickness. The optical thickness is a mathematical product of a layer's physical thickness and its refractive index. The optical thickness is described as a fraction of a design wavelength $\lambda_0$. In the present invention, $\lambda_0$ may be some wavelength in the range from about 480 nm to 560 nm, corresponding approximately to the middle of the visible spectrum. The selection of the specific design wavelength $\lambda_0$, would depend on the range of wavelengths over which the coating must be effective. Preferably, $\lambda_0$ is about 510 to 520 nm.

The first, or outermost layer 20, has a low refractive index, preferably lower than that of the substrate 15. The optical thickness of layer 20 is about one-quarter wavelength at the design wavelength $\lambda_0$. The second layer 22 has a refractive index higher than that of the substrate. The second layer 22 has an optical thickness between about one-quarter and one-third wavelength at the design wavelength $\lambda_0$. This may be contrasted with the traditional Rock-type optical coating utilizing titanium oxide in which the second layer is one-half wavelength or even more. The third layer 24 has a refractive index less than that of the second layer, and it may be equal to the refractive index of the first layer. The third layer 24 has an optical thickness of about one-tenth wavelength or less at the design wavelength $\lambda_0$. The fourth, or innermost layer 26, adjacent to the substrate, has a refractive index greater than that of the substrate. The refractive index of the fourth layer 26 may be equal to the refractive index of the second layer 22. Fourth layer 26 may have an optical thickness of about one-tenth wavelength at the design wavelength $\lambda_0$. The total optical thicknesses of layers 24 and 26 is generally less than about one-quarter wavelength at the design wavelength $\lambda_0$, and, more preferably, is about one-sixth wavelength. The refractive indices of layers 20 and 22 must have a specific relationship to yield the lowest reflection across the visible spectrum. The first and third layers may have refractive indices between about 1.2 and 1.5, and the second and fourth layers may have refractive indices between about 1.9 and 2.2.

In DC reactively sputtered coatings, the preferred material for layers 20 and 24 is silicon dioxide. This material is preferred because it is durable and is readily deposited by DC reactive sputtering. Silicon dioxide has a refractive index of about 1.46 at a wavelength of about 520 nm.

Layers 22 and 26 are DC reactively sputtered metal oxide layers. One of the layers 22 or 26 is a metal oxide layer which may be quickly deposited, such as tin oxide, indium oxide, zinc oxide, tin-doped indium oxide, antimony-doped tin oxide, bismuth-tin oxide and zinc-tin oxide. In order to reduce the amount of heat that reaches the substrate, it is preferable that the thicker layer, second layer 22, be from this group. It is more preferable, however, that both the second layer 22 and the fourth layer 26 be from this group of metal oxides.

The metal oxide layers may be conductive or non-conductive. It is preferred that tin oxide be used for a non-conductive metal oxide layer. It is preferred that tin-doped indium be used for a conductive metal oxide layer.

The present invention has been described in terms of a relative refractive index sequence and an optical thickness range. The exact physical and optical thickness of the layers will depend on the materials used, and the performance desired. In addition, different methods of deposition for a selected layer may produce different refractive index values.

The human eye is more sensitive to some wavelengths of visible light than other wavelengths. One way to measure the effectiveness of a antireflection coating is to compare the luminosity of the coatings. Luminosity is an integration of the reflectance of the coating over the visible wavelengths, weighted by the responsiveness of the human eye.

Figure 2:
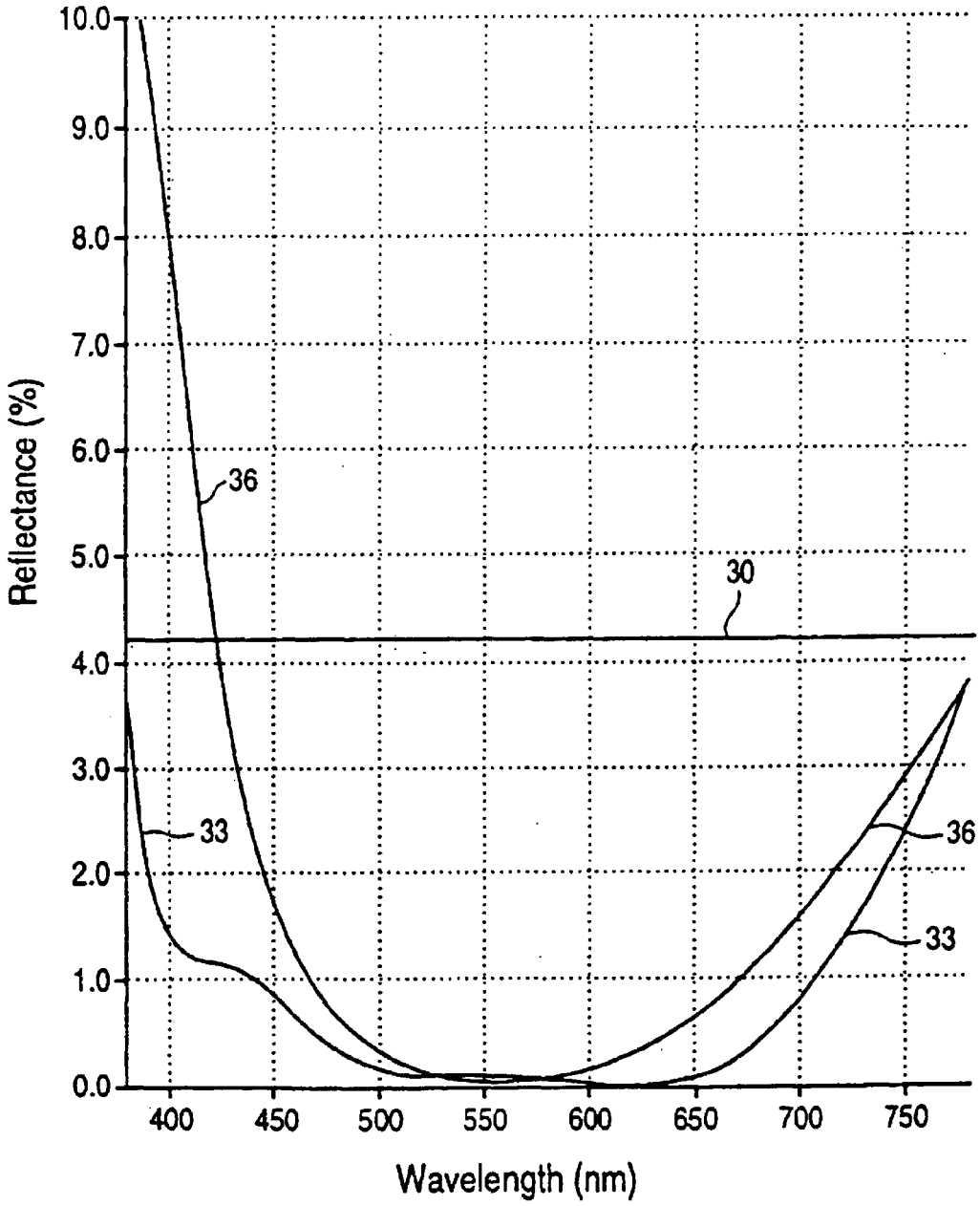
FIG. 2 is a graphical representation illustrating computed reflection values as a function of wavelength for a substrate lacking an antireflection coating, a substrate with a four layer antireflection coating using titanium oxide, and a substrate with a four layer antireflection coating in accordance with the present invention.

FIG. 2 shows the computed reflection performance for three different systems. The reflectivity of a plain glass or plastic substrate without any antireflective coating is given by curve 30. In a glass or plastic substrate having a index of refraction of about 1.5, the reflectance will be about 4.3 percent across the entire visible spectrum. Although both glass and plastic have slightly higher reflectivity at the blue end of the spectrum, the reflectivity may be approximated with a single value, as shown by curve 30. The luminosity of an uncoated substrate is about 4.3 percent.

Curve 33 shows the reflectance as a function of wavelength for a glass substrate having a four layer antireflection coating constructed according to Rock, as discussed below with reference to Table 1, and using titanium oxide layers. Curve 36 shows the reflectance as a function of wavelength of a plastic substrate having a four layer coating constructed according to the present invention, and utilizing a tin oxide layer that may be swiftly deposited.

In the example of Table 1, the material forming layers 20 and 24 is silicon dioxide having a refractive index of about 1.46, and the material forming layers 22 and 26 is titanium dioxide, having a refractive index of about 2.35. The luminosity of the four layer coating utilizing two titanium dioxide layers is approximately 0.10 percent. This is a forty-fold improvement in luminosity over a glass substrate lacking an anti-reflection coating.

TABLE 1

| | Material | Refractive Index at 550 nm | Thickness (nm) | Optical Thickness $\lambda_0$ = 550 nm |
|---|---|---|---|---|
| | air | 1.0 | | |
| 1 | $SiO_2$ | 1.48 | 88.97 | 0.239 |
| 2 | $TiO_2$ | 2.38 | 105.78 | 0.459 |
| 3 | $SiO_2$ | 1.48 | 30.89 | 0.083 |
| 4 | $TiO_2$ | 2.38 | 12.31 | 0.053 |
| | substrate | 1.52 | | |

Two specific examples of a coating 10 constructed according to the present invention are described below with reference to Tables 2 and 3. Curve 36 in FIG. 2 is the computed performance of the embodiment of Table 2. The computed performance of the embodiment of Table 3 is virtually identical to the performance of the embodiment of Table 2 shown by curve 36, and therefore is not shown.

In the embodiment of Table 2, the first layer and the third layer 24 are silicon dioxide ($SiO_2$), and the second layer 22 and fourth layer 26 are tin oxide ($SnO_2$). The silicon dioxide layers have a refractive index of about 1.48 and the tin oxide layers have a refractive index of about 2.13 at a reference wavelength $\lambda_0$ of 510 nm. The first layer is 94.16 nm thick, the second layer is 76.35 nm thick, the third layer is 31.87 nm thick and the fourth layer is 20.29 nm thick. This coating has a computed luminosity of about 0.19 percent. This is about a twenty-fold improvement in luminosity over a plastic substrate lacking an antireflection coating, and compares favorably with the coating of Table 1.

TABLE 2

| | Material | Refractive Index at 550 nm | Thickness (nm) | Optical Thickness $\lambda_0$ = 550 nm |
|---|---|---|---|---|
| | air | 1.0 | | |
| 1 | $SiO_2$ | 1.48 | 94.16 | 0.253 |
| 2 | $SnO_2$ | 2.00 | 76.35 | 0.278 |
| 3 | $SiO_2$ | 1.48 | 31.87 | 0.086 |
| 4 | $SnO_2$ | 2.00 | 20.29 | 0.074 |
| | substrate | 1.52 | | |

In the embodiment of Table 3, silicon dioxide is used for the first layer 20 and the third layer 24, and tin oxide is used for the second layer 22 and the fourth layer 26. The silicon dioxide layer has a refractive index of about 1.48 at the reference wavelength $\lambda_0$ of 550 nm. The tin oxide layer has a refractive index of about 2.0 at the reference wavelength of 550 nm. The first layer is 92.22 nm thick, the second layer is 78.13 nm thick, the third layer is 32.21 nm thick and the fourth layer is 18.64 nm thick. This embodiment has a computed luminosity of approximately 0.22 percent, which is about the same as the embodiment of Table 2.

TABLE 3

| | Material | Refractive Index at 510 nm | Thickness | Optical Thickness $\lambda_0$ = 510 nm |
|---|---|---|---|---|
| | air | 1.0 | | |
| 1 | $SiO_2$ | 1.48 | 92.22 | 0.268 |
| 2 | $SnO_2$ | 2.13 | 78.13 | 0.302 |
| 3 | $SiO_2$ | 1.48 | 32.21 | 0.094 |
| 4 | $SnO_2$ | 2.13 | 18.64 | 0.072 |
| | substrate | 1.52 | | |

A conductive coating for a temperature sensitive substrate may be constructed by replacing one or both tin oxide layers with tin-doped indium oxide layers. In the embodiment of Table 4, silicon dioxide is used for the first layer 20 and the third layer 24, tin-doped indium oxide is used for the second layer 22, and tin oxide is used for the fourth layer 26. This embodiment has a computed luminosity of approximately 0.20 percent.

TABLE 4

| | Material | Refractive Index at 550 nm | Thickness | Optical Thickness $\lambda_0$ = 550 nm |
|---|---|---|---|---|
| | air | 1.0 | | |
| 1 | $SiO_2$ | 1.48 | 92.02 | 0.248 |
| 2 | ITO | 2.04 | 76.11 | 0.282 |
| 3 | $SiO_2$ | 1.48 | 28.35 | 0.076 |
| 4 | $SnO_2$ | 2.00 | 22.83 | 0.083 |
| | substrate | 1.52 | | |

A nonconductive coating for a plastic substrate having a low index of refraction may be constructed in accord with this invention. In the embodiment of Table 5, the substrate 15 is acrylic plastic with an index of refraction of 1.475. Silicon dioxide is used for the first layer 20 and the third layer 24, and tin oxide is used for the second layer 22 and the fourth layer 26. This embodiment has a computed luminosity of approximately 0.18 percent.

TABLE 5

| | Material | Refractive Index at 550 nm | Thickness | Optical Thickness $\lambda_0$ = 550 nm |
|---|---|---|---|---|
| | air | 1.0 | | |
| 1 | $SiO_2$ | 1.48 | 93.54 | 0.252 |
| 2 | $SnO_2$ | 2.00 | 76.35 | 0.278 |
| 3 | $SiO_2$ | 1.48 | 35.10 | 0.094 |
| 4 | $SnO_2$ | 2.00 | 19.13 | 0.070 |
| | substrate | 1.47 | | |

The deposition rates of the metal oxides used in the coatings of the present invention are very high, about five to fifty times higher than titanium dioxide, and may equal or exceed the sputtering speed of silicon dioxide. Thus, the coating of the present invention may be deposited in an in-line device where the substrate moves at a constant high linespeed. This greatly reduces production costs because of higher production speeds.

For example, a coating with silicon dioxide and tin oxide layers, such as the coating of Table 2, may be deposited by DC reactive sputtering in an argon and oxygen atmosphere on a 42 inch by 50 inch substrate at a linespeed of 80 inches per minute. The in-line machine may have one tin cathode running at approximately 8 KW each, two silicon cathodes running at approximately 15 KW each, two tin cathodes running at approximately 10 KW each, and finally six silicon cathodes running at approximately 15 KW each.

Deposition of the metal oxide layers of the present invention uses only about two percent of the input power that would be required by titanium oxide layers running at the same linespeed. For example, to deposit a coating with silicon dioxide and titanium dioxide layers, such as the antireflection coating of Table 1, at a linespeed of 80 inches per minute, the in-line coater would need at least seven titanium cathodes running at 150 KW each. Therefore, a coating constructed according to the present invention will impart only about two percent as much heat to the substrate a coating using titanium dioxide. In addition, a coating constructed according to the present invention can be deposited at reasonable input power at high linespeed.

The present invention has been described in terms of preferred embodiments. The invention, however, is not limited to the embodiments depicted and described. Rather, the scope of the invention is defined by the appended claims.

What is claimed is:

1. A coated article comprising:

a temperature-sensitive substrate having a melting point lower than glass;

an anti-reflection coating including a plurality of layers [substantially] transparent to visible light, at least [one] *two* of said layers being a [DC] reactively sputtered *high refractive index* material *layer* having a refractive index higher than said substrate *and between approximately 1.9 and 2.2* and selected from the group consisting of tin oxide, indium oxide, zinc oxide, tin-doped indium oxide, antimony-doped tin oxide, tin-bismuth oxide, and tin-zinc oxide, and at least one other layer *being a low refractive index material layer* having a refractive index lower than said substrate, *wherein said high refractive index material layer farthest from said substrate having an optical thickness of about one-quarter to one-third wavelength at a wavelength between 480 and 560 nanometers*.

2. The article of claim 1 wherein said substrate is plastic.

3. The article of claim 1 wherein said other layer is [substantially] silicon dioxide.

4. The article of claim 3 wherein said [DC] reactively sputtered material is tin oxide.

5. The article of claim 3 wherein said [DC] reactively sputtered material is tin-doped indium oxide.

[6. The article of claim 1 wherein said DC reactively sputtered material has a refractive index between 1.9 and 2.2. ]

7. The article of claim 1 wherein said plurality of layers includes four layers designated the first, second, third, and fourth layers in consecutive numerical order beginning with the layer farthest from the substrate, said first layer *composed of silicon dioxide and* having a refractive index lower than said substrate and having an optical thickness of about one-quarter wavelength at a wavelength between 480 and 560 nanometers, said second layer having a refractive index higher than said substrate *and between approximately 1.9 and 2.2* and having an optical thickness between about one-quarter and one-third of a wavelength at a wavelength between 480 and 560 nanometers *and comprising one of said two layers*, said third layer having a refractive index lower than said second layer *and comprising said one other layer*, said fourth layer having a refractive index greater than said third layer *and comprising the other of said two layers*, said third and fourth layers having a total optical thickness less than one-quarter wavelength at a wavelength between 480 and 560 nanometers, and

[at least one of] said second and fourth layers being said selected sputtered material.

8. A process for making a coated article, comprising the steps of:

providing a temperature-sensitive [surface] *substrate* having a melting point lower than glass *and a surface for receiving an anti-reflection coating*; [and]

[disposing] *depositing* an anti-reflection coating including a plurality of layers substantially transparent to visible light on said surface, said disposing step including the steps of [DC reactively] sputtering [a] *at least two layers of high refractive index* material selected from the group consisting of tin oxide, indium oxide, zinc oxide, tin-doped indium oxide, antimony-doped tin oxide, tin-bismuth oxide, and tin-zinc oxide, and *having an index of refraction between approximately 1.9 and 2.2 wherein the layer of high refractive index material farthest from the substrate has an optical thickness of about one-quarter to one-third wavelength at a wavelength from 480 to 560 nanometers; and* depositing at least one [other] layer *of a low refractive index material* having a refractive index [different from] *lower than* said [DC reactively sputtered] *high refractive index* material *wherein one of said low refractive index material layers is deposited between said high refractive index material layers*.

9. An anti-reflection coating for a substrate, comprising:

four layers substantially transparent to visible light and designated the first, second, third, and fourth layers in consecutive numerical order beginning with the layer farthest from the substrate;

said first layer [substantially] composed of silicon dioxide having a refractive index lower than said substrate, an optical thickness of about one-quarter wavelength at a wavelength between 480 and 560 nanometers, and a physical thickness of about 94.2 nanometers;

said second layer [substantially] composed of [DC reactively sputtered] tin oxide having a refractive index higher than said substrate, an optical thickness between about one-quarter and one-third of a wavelength at a wavelength between 480 and 560 nanometers, and a physical thickness of about 76.4 nanometers;

said third layer [substantially] composed of silicon dioxide having a refractive index lower than said second layer and a physical thickness of about 31.9 nanometers;

said fourth layer [substantially] composed of [DC reactively sputtered] tin oxide having a refractive index greater than said third layer and a physical thickness of about 20.3 nanometers; and said third and fourth layers having a total optical thickness less than one-quarter wavelength at a wavelength between 480 and 560 nanometers.

10. An anti-reflection coating for a substrate, comprising:

four layers [substantially] transparent to visible light and designated the first, second, third, and fourth layers in consecutive numerical order beginning with the layer farthest from the substrate;

said first layer [substantially] composed of silicon dioxide having a refractive index lower than said substrate, an optical thickness of about one-quarter wavelength at a wavelength between 480 and 560 nanometers, and a physical thickness of about 92.2 nanometers;

said second layer [substantially] composed of [DC reactively sputtered] tin oxide having a refractive index higher than said substrate, an optical thickness between [about] one-quarter and one-third of a wavelength at a wavelength between 480 and 560 nanometers, and a physical thickness of about 78.1 nanometers;

said third layer [substantially] composed of silicon dioxide having a refractive index lower than said second layer and a physical thickness of about 32.2 nanometers;

said fourth layer [substantially] composed of [DC reactively sputtered] tin oxide having a refractive index greater than said third layer and a physical thickness of about 18.6 nanometers; and said third and fourth layers having a total optical thickness less than one-quarter wavelength at a wavelength between 480 and 560 nanometers.

*11. The article of claim 1 wherein said sputtered material is a DC reactively sputtered material.*

*12. The article of claim 11 wherein said substrate is plastic.*

*13. The article of claim 12 wherein said DC reactively sputtered material is tin oxide.*

*14. The article of claim 12 wherein said DC reactively sputtered material is tin-doped indium oxide.*

*15. The article of claim 11 wherein said other layer is substantially silicon dioxide.*

*16. The article of claim 11 wherein said plurality of layers includes four layers designated the first, second, third and fourth layers in consecutive numerical order beginning with the layer farthest from the substrate,*

*said first layer composed of silicon dioxide with a refractive index lower than said substrate and having an optical thickness of about one-quarter wavelength at a wavelength between 480 and 560 nanometers,*

*said second layer having a refractive index higher than said substrate and between approximately 1.9 and 2.2 and having an optical thickness between about one-quarter and one-third of a wavelength at a wavelength between 480 and 560 nanometers and comprising one of said two layers,*

*said third layer having a refractive index lower than said second layer and comprising said one other layer,*

*said fourth layer having a refractive index greater than said third layer and comprising the other of said two layers, said third and fourth layers having a total optical thickness less than one-quarter wavelength at a wavelength between 480 and 560 nanometers, and said second and fourth layers being said selected sputtered material.*

*17. The article of claim 1 wherein the low refractive index material farthest from said substrate has an optical thickness of about one-quarter wavelength at a wavelength from 480 to 560 nanometers.*

*18. The process of claim 8 wherein the step of sputtering is DC reactively sputtering.*

*19. The process of claim 8 wherein the act of depositing at least one other anti-reflection coating layer comprises depositing the layer between the at least two layers.*

*20. The process of claim 8 wherein the low refractive index material farthest from said substrate is deposited at an optical thickness of about one-quarter wavelength at a wavelength from 480 to 560 nanometers.*

*21. The coating of claim 9 wherein the tin-oxide of said second layer is reactively sputtered and the tin oxide of said fourth layer is reactively sputtered.*

*22. The coating of claim 21 wherein said tin oxide of said second layer is DC reactively sputtered and said tin oxide of said fourth layer is DC reactively sputtered.*

*23. The coating of claim 9 wherein the tin oxide of said second layer is sputtered and the tin oxide of said fourth layer is sputtered.*

*24. The coating of claim 10 wherein the tin oxide of said second layer is reactively sputtered and the tin oxide of said fourth layer is reactively sputtered.*

*25. The coating of claim 24 wherein the tin oxide of said second layer is DC reactively sputtered and the tin oxide of said fourth layer is DC reactively sputtered.*

*26. The coating of claim 10 wherein the tin oxide of said second layer is sputtered and the tin oxide of said fourth layer is sputtered.*

*27. An article comprising:*

*(a) a temperature-sensitive substrate having a melting point lower than glass; and*

*(b) an anti-reflective coating comprising a plurality of layers transparent to visible light beginning with the first layer being farthest from said substrate, wherein:*

*(1) a first layer and a third layer are composed of silicon dioxide; and*

*(2) a second layer and a fourth layer have refractive indices between approximately 1.9 and 2.2 and are each composed of and selected from the group consisting of tin oxide, indium oxide, zinc oxide, tin-doped indium oxide, antimony-doped tin oxide, tin-bismuth oxide, and tin-zinc oxide, wherein said second layer has an optical thickness of about one-quarter to one-third wavelength at a wavelength from 480 to 560 nanometers.*

*28. The article of claim 27 wherein the temperature-sensitive substrate is plastic.*

*29. The article of claim 27 wherein said first layer has an optical thickness of about one-quarter wavelength at a wavelength from 480 to 560 nanometers.*

*30. An article comprising:*

(a) *a temperature-sensitive substrate having a melting point lower than glass; and*

(b) *an anti-reflection coating comprising a plurality of layers transparent to visible light, wherein:*

(1) *a first layer and a third layer are composed of silicon dioxide and*

(2) *a second layer and a fourth layer have refractive indices between approximately 1.9 and 2.2, and wherein the second and fourth layers are each composed of and selected from the group consisting of tin oxide, indium oxide, zinc oxide, tin-doped indium oxide, antimony-doped tin oxide, tin-bismuth oxide, and the tin-zinc oxide, wherein the second layer has a thickness of between approximately 77.11 and 78.13* nm.

*31. An article comprising:*

(a) *a temperature-sensitive substrate having a melting point lower than glass; and*

(b) *an anti-reflection coating comprising a plurality of layers transparent to visible light, wherein:*

(1) *a first layer and a third layer are composed of silicon dioxide; and*

(2) *a second layer and a fourth layer have refractive indices between approximately 1.9 and 2.2, and wherein the second and fourth layers are each composed of and selected from the group consisting of tin oxide, indium oxide, zinc oxide, tin-doped indium oxide, antimony-doped indium oxide, tin-bismuth oxide, and tin-zinc oxide, wherein the fourth layer has a thickness of between approximately 18.64 and 22.83 nm.*

*32. A method for providing an anti-reflection coating to a plastic substrate, wherein the coating comprises a first, second, third and fourth layer in consecutive numerical order, each layer being transparent to visible light, with the first layer being farthest from the substrate, comprising:*

*depositing the fourth layer by reactive sputtering, wherein the fourth layer is composed of tin-doped indium oxide having an index of refraction between approximately 1.9 and 2.2;*

*depositing the third layer on the fourth layer by reactive sputtering, wherein the third layer is composed of silicon dioxide;*

*depositing the second layer on the third layer by reactive sputtering at an optical thickness of about one-quarter to one-third wavelength at a wavelength from 480 to 560 nanometers, wherein the second layer is substantially composed of tin-doped indium oxide having an index of refraction between approximately 1.9 and 2.2; and*

*depositing the first layer on the second layer by reactively sputtering, wherein the first layer is substantially composed of silicon dioxide.*

*33. The method of claim 32 wherein said first layer has an optical thickness of about one-quarter wavelength at a wavelength from 480 to 560 nanometers.*

*34. An anti-reflection coating for a plastic substrate comprising:*

(1) *a first layer composed of silicon dioxide;*

(2) *a conductive second layer, closer to the substrate than the first layer, composed of tin-doped indium oxide having an index of refraction between approximately 1.9 and 2.2 and an optical thickness of about one-quarter to one-third wavelength at a wavelength from 480 to 560 nanometers;*

(3) *a third layer, closer to the substrate than the second layer, composed of silicon dioxide; and*

(4) *a conductive fourth layer, closer to the substrate than the third layer, composed of tin-doped indium oxide having an index of refraction between approximately 1.9 and 2.2,*

*wherein the first, second, third and fourth layers are transparent to visible light.*

*35. The coating of claim 34 wherein said first layer has an optical thickness of about one-quarter wavelength at a wavelength from 480 to 560 nanometers.*

*36. A method for providing an anti-reflection coating to a plastic substrate, wherein the coating comprises a first, second, third and fourth layer in consecutive numerical order with the first layer being farthest from the substrate, wherein each layer is transparent to visible light, comprising:*

*depositing the first and third layers by reactive sputtering, wherein the first layer is composed of silicon dioxide; and*

*depositing the second and fourth layers by reactively sputtering, wherein the second and fourth layers have an index of refraction between approximately 1.9 and 2.2, are composed of and selected from the group consisting of tin oxide, indium oxide, zinc oxide, tin-doped indium oxide, antimony-doped tin oxide, tin-bismuth oxide, and tin-zinc oxide and wherein said second layer is applied at an optical thickness of about one-quarter to one-third wavelength at a wavelength from 480 to 460 nanometers.*

*37. The method of claim 36, wherein the act of depositing the second and fourth layers comprises depositing the second layer such that the layer is between approximately 76.11 and 76.35 nm and depositing the fourth layer such that the layer is between approximately 18.64 and 22.83 nm.*

*38. The method of claim 36, wherein the act of depositing the first silicon dioxide layer comprises depositing the layer such that the layer is between approximately 92.02 and 94.16 nm.*

*39. The method of claim 36 wherein said first layer has an optical thickness of about one-quarter wavelength at a wavelength from 480 to 560 nanometers.*

*40. An anti-reflection coating for a plastic substrate comprising:*

*a plastic substrate and a coating wherein said coating includes,*

*four layers transparent to visible light designated the first, second, third and fourth layers in consecutive numerical order beginning with the layer farthest from the substrate, said first and third layers comprised of silicon dioxide and said second and fourth layers having a refractive index higher than said substrate and between 1.9 and 2.2 and selected from the group consisting of tin oxide, indium oxide, zinc oxide, tin-doped indium oxide, antimony-doped tin oxide, tin-bismuth oxide and tin-zinc oxide; and*

*said second layer having an optical thickness of about one-quarter to one-third of a wavelength at a wavelength of about 480 to 560 nanometers.*

*41. The coating of claim 40 wherein said first layer has an optical thickness of about one-quarter wavelength at a wavelength from 480 to 560 nanometers.*

*42. An anti-reflective coating for a plastic substrate consisting essentially of:*

*a plurality of high refractive index material layers transparent to visible light, having a refractive index between 1.9 and 2.2 and selected from the group consisting of tin oxide, indium oxide, zinc oxide, tin-*

*doped indium oxide, antimony-doped tin oxide, tin-bismuth oxide and tin-zinc oxide and wherein the high refractive index material layer farthest from said substrate has an optical thickness of about one-quarter to one-third wavelength at a wavelength from 480 to 560 nanometers; and*

*at least one low refractive index material layer having a refractive index material layer lower than each of said plurality of high refractive index material layers wherein one of said at least one low refractive index material layers is disposed between adjacent ones of said plurality of high refractive index material layers.*

*43. The coating of claim 42 wherein the low refractive index material farthest from said substrate has an optical thickness of about one-quarter wavelength at a wavelength from 480 to 560 nanometers.*

*44. An anti-reflection coating for a plastic substrate comprising:*

*a plurality of high refractive index material layers comprising first and second high refractive index material layers transparent to visible light having a refractive index higher than said substrate and between 1.9 and 2.2 and selected from the group consisting of tin oxide, indium oxide, zinc oxide, tin-doped indium oxide, antimony-doped tin oxide, tin-bismuth oxide and tin-zinc oxide; and*

*at least one low refractive index material layer having a refractive index lower than said substrate wherein said at least one low refractive index material layer is positioned between said first and second high refractive index material layers and the high refracting index material layer farthest from said substrate has an optical thickness of about one-quarter to one-third wavelength at a wavelength from 480 to 560 nanometers.*

*45. The coating of claim 44 wherein the low refractive index material farthest from said substrate has an optical thickness of about one-quarter wavelength at a wavelength from 480 to 560 nanometers.*

* * * * *